2,995,438
PREPARATION OF ORES FOR METALLURGICAL USE

André Subervie, Bordeaux, France; Georges Michel Subervie, Bordeaux, France, sole heir of said André Subervie, deceased
No Drawing. Filed Nov. 25, 1958, Ser. No. 776,193
6 Claims. (Cl. 75—5)

In metallurgical installations it is necessary to charge the treatment apparatus, blast furnaces, low furnaces, melting furnaces, etc., with calibrated materials, ores, coke and flux in order to ensure their regular working and efficient output. Especially as far as the ore is concerned, this latter is often in a naturally powdered state and cannot directly be uitilised in this form. If, on the other hand, it is extracted in a compact form, its preparation for utilisation in suitable dimensions by crushing and sorting gives rise to a substantial proportion of fines which cannot directly be utilised. Neither can certain materials be utilised such asb last-furnace dust, roll-train scale, hammer-slag, roasting residues, washing products which are rich in metal, these materials being of such fine consistency that they are not easy to utilise.

In order to make use of these powdered products, it has been thought for a long time that they could evidently be transformed by agglomeration into blocks which could be utilised in metallurgical apparatus. This agglomeration is usually effected by adding a binding agent to the powdered substances and forming them by compression into small bricks or balls. However, these often lack cohesion and offer inadequate resistance to the mechanical stresses to which they are subjected in the apparatus. It has been proposed to improve their qualities by subjecting them to a baking process. This method of operation is costly. It requires special installations and an appreciable expenditure of power.

Whereas this process requires that the materials uitilised should be compressed, a number of metallurgical plants produce an agglomeration of powdered ores according to a treatment of scorification by combustion. The powdered ore is mixed with a small proportion of fuel and, if needed, a flux such as for example lime-stone. Combustion is then initiated and, as it develops, it produces adhesion of the particles and their formation in blocks. This process is employed particularly in a non-continuous manner in the Greenawald ore-bunkers, or in a continuous manner in the Dwight-Lloyd chains of the straight or circular type, or also in the ABI or rotary furnace installations (Schmidt process).

In these apparatus, a current of air is caused to pass through the powdered ore which is mixed with fuel. The fuel being ignited, the combustion spreads from place to place while remaining under control up to the point of creating a nascent fusion of the ore which ensures the adhesion of the grains. From the mass obtained, the elements which have become agglomerated are separated and are sent to the metallurgical treatment; the non-agglomerated elements (uncooked waste products, etc.) are separated and re-treated in a further operation.

This process gives good results. Not only does it ensure the transformation of powdered materials into blocks which are cohesive and hard, for which reason it has been given the name of "agglomerating sintering"; but it sometimes enriches the ore by the elimination of certain compounds such as sulphur or carbon dioxide (carbonates) which are carried away with the products of combustion and can also be recovered. This entails various drawbacks, however. The first is of course a high fuel consumption. But above all the use of the ore and the fuel should comply with various difficult conditions of granulometry. In fact it is preferable that the layer should be sufficiently porous to ensure the maintenance of the combustion. But it should not on the other hand be too permeable because the combustion would then be incomplete and not sufficient to produce agglomerating fusion (sintering). Thus, on the Dwight-Lloyd chains especially, ores and coke are used which have a granular size of less than 8 mm., and the mass under treatment must also be sprayed over a protective layer having a granular size of 8 to 25 mm. without fuel.

For materials which are finer than this, the Dwight-Lloyd chain would be inoperative, while a larger granular size would also be a source of difficulties.

The object of the present invention is a method of preparation of ores for use in apparatus for agglomeration by combustion, thus permitting the necessities imposed by existing agglomeration processes to be avoided, whether they concern agglomerating sintering or the direct use of agglomerates. This preparation also improves the quality of the agglomerates and even results in an economy of fuel.

This method is characterised in that the granular elements are collected and mixed with an inverse emulsion of hydrocarbon oils, then with a mixture of powdered pitch and cement or like product, and the granular elements thus prepared are coated with the powdered ore to form grains or nodules suitable for feeding into the igneous agglomeration apparatus.

The granular elements may be grains of fuel, especially coke, or a flux such as limestone for example. Should the ore to be used have a large and open granular structure, the largest grains may serve if necessary as granular elements for the purpose of fixing the finest particles.

In the case where the ores are very fine, the granular elements may be formed by the ore itself, agglomerated into small balls on tiny drops of water.

The inverse emulsion, that is to say of the water-in-oil type, is obtained by mixing either at a cold or lukewarm temperature, 60 to 90° C., a weak alkaline lye with a hydrocarbon oil produced from tars or petroleum. This oil is sufficiently rich in emulsifying elements: phenols and their homologues in the case of tar oils, naphthenic acid and its homologues in the case of petroleum oils. The mixture is effected simply by stirring and gives rise to a stable product.

The mixture of powdered pitch and cement, very finely ground together, hereinafter referred to as "asphalt cement" may contain any proportion of pitch and cement. An advantageous proportion is 50% of pitch and 50% of cement by weight. The cement may be replaced by another like product such as limestone, lime, slag, etc.

Experience shows that when the inverse emulsion is in contact with the asphalt cement, a break-down takes place, the oil of the emulsion is adsorbed by the pitch of the asphalt cement so as to constitute a final binding agent of high viscosity which is coated on the material thus treated, whereas the alkaline solution freed from the emulsion forms an external protection.

By thus treating the granular elements with the inverse emulsion and asphalt cement, a binder is formed at the surface of said granular elements which retains the particles of powdered ore in such a way that a coating is formed on said elements. The aqueous phase of the broken emulsion lies on the surface and forms a surface layer which isolates the coated grains from each other and prevents their adhesion. These grains may be stored without agglutinating with each other.

During subsequent agglomeration, this surface exudation assists in the maintenance of porosity of the grains, small balls or agglomerated nodules as well as that of the layer of agglomerates, this being so both for their igneous agglomeration and for their further metallurgical transformation.

The final high viscosity binding agent thus formed and retaining the treated particles is combustible. It is even a fuel of high calorific power, at least in its hydrocarbon oil content. After playing its part in the initial assembling of the particles, this fuel subsequently contributes to the combustion, either in the igneous agglomeration or in the metallurgical treatment. It is thus possible to reduce in consequence or even to eliminate the fuel initially added to the mass of ore to be agglomerated, which constitutes an appreciable economy.

It is to be noted that this binding agent, which has the additional and subsequent function of a fuel, is mixed with the ore in intimate and uniform contact, the contact by coating with a liquid product being much closer than that which occurs between solid grains. The result of this is that further treatments are made more consistently. With igneous agglomeration, regularity of combustion is induced by a greater uniformity of the internal porosity of the agglomerates obtained. In the case in which the agglomerates are directly utilised for metallurgical treatment, a uniform reduction is obtained and consequently, a more efficient output.

It will be observed that the method in accordance with the invention, at least in the metallurgical industry, only requires the normal by-products of that industry. The asphalt cement can be obtained from the pitch produced by distillation of tars in coking plants and from basic slags. The inverse emulsion is effected with crude tar from coking plants or from the light oils produced by the distillation of these tars.

The coated products, granular elements, small balls or agglomerates, are of sufficient hardness to be used directly for charging the apparatus for igneous agglomeration. They may serve for feeding directly into the ore-bunkers or agglomeration chains of the Greenawald type, Dwight-Lloyd or others. They relieve the supply of any need for granulometric treatment. In particular, these agglomerates are placed on a Dwight-Lloyd chain without an underlying protective layer, which appreciably simplifies the operation by reducing or suppressing the returns. The height of the layer of the same porosity which is to be treated may be increased. In addition, the combustion is more convenient to manage and is better controlled, thus enabling the quantity of uncooked products to be reduced while still increasing the production. The agglomerates obtained have a uniform porosity which is beneficial to their subsequent reduction. In a general manner, the efficiency is improved.

By choosing the dimensions of the small balls, granules or agglomerates and the thickness of the layer which is subjected to treatment, any value of porosity required may be obtained that is compatible with the duration and intensity of the combustion required.

The proportion of asphalt cement added to the ore varies between 1 and 5% by weight of this latter. The proportion of inverse emulsion to be utilised is between 1 and 5% of the weight of the ore.

The proportion of fuel introduced, either coke or coal, is calculated to take into account the combustible binding agent utilised for the agglomeration. It frequently occurs that the binder is sufficient to ensure the combustion of the agglomeration treatment, in which case no supplementary fuel is necessary.

Used alone or in conjunction with another fuel, the binding agent which is evenly distributed in intimate contact with the ore, produces while burning a great number of holes in the agglomerate and confers on this latter a uniform porosity which subsequently proves beneficial to an easy and regular reduction.

The quantity of fuel and flux required to obtain fusion at a definite given temperature is determined for each ore by a preliminary laboratory test.

By the choice of proportions, self-melting coated elements can easily be produced which agglomerate spontaneously at a pre-determined temperature.

The process in accordance with the invention is applied to all ores or all powdered materials which are likely to be utilised in metallurgy. It can be utilised for the ores of all metals, the production of which requires igneous fusion, starting from calibrated products: iron, copper, lead, etc. (minette, pyrites, blends, etc.). But it may also be applied to the production of agglomerates which can be used in other techniques: electrolysis or the like, for instance in the case of chrome ores (chromite).

EXAMPLES

1. *Agglomeration of pyrites ash*

The ashes of pyrites obtained by the flash-roasting process consist of a dust which is rich in iron, having a very fine granular size of the order of a micron.

In order to utilise this dust in metallurgy, it is essential to agglomerate it. But this agglomeration is difficult, especially on a Dwight-Lloyd chain.

It may be made simple in accordance with the invention by means of the procedure described below.

The ashes of pyrites which come from the roasting-furnace are humidified with approximately 7% of water and have added to them 1 to 5% of asphalt cement, composed of 50% of pitch and 50% of slag (by weight). This addition is effected by stirring.

An ossature of limestone or coke, or the two mixed together having a granular size of up to about 5 mm. is also prepared. These materials are moistened with 7% of water if needed. They are placed in a mixer in which is poured 1 to 2% by weight of the inverse emulsion of tar and alkaline lye mentioned previously. The mixing operation produces a coating on the grains of limestone or coke.

When this coating is obtained, the mixture of pyrites ash and asphalt cement which has been previously defined is poured into the mixer. The very fine pitch of asphalt cement forms with the oil of emulsion a binding agent of high viscosity to which the very fine grains of the ashes adhere. There is thus formed an agglomerated mass resulting in grains covered with ashes of pyrites and utilisable as the starting materials for igneous agglomeration in accordance with the usual processes.

When the first coating is completed and when the absorption capacity of the binder is exhausted, a fresh quantity of inverse emulsion may be sprayed into the mixture, in a quantity of the order of 1 to 2%. This addition softens the first binder and makes it ready to receive a fresh layer of the mixture of ashes of pyrites and asphalt cement, this mixture having the same effect as previously, of thickening the coating obtained.

2. *Agglomeration of the fine ores produced by the crushing of rocks*

Certain very hard rocks, known as taconites, contain a very rich iron ore which is disseminated, however, in the rock. To enable this ore to be utilised, the rock has to be finely crushed and the separation is carried out by the usual method: floatation, magnetic sorting, etc. This process enables the concentrated ore to be obtained, though in the form of a fine powder with grains of the order of from 1 mm. to about 10 mm. in diameter.

This powdered ore has to be agglomerated in order to be utilised in metallurgy. Sometimes this agglomeration is carried out by means of a clay binding agent, especially bentonite, and by cooking in a rotary furnace. This however, requires heavy and costly equipment.

In accordance with the invention, the operation is more simply and more economically carried out by preparing coated products which are subsequently processed on a Dwight-Lloyd chain or like apparatus.

To this end, elements of limestone or grains of coke having a granular size of up to about 5 mm. in diameter are placed in a mixer, and into these is poured 1 to 2% by weight of an inverse emulsion of tar in an alkaline solution. When the grains are coated by the emulsion, they then receive an addition of 1 to 2% by weight of asphalt cement.

The emulsion is immediately broken down and a final binder of high viscosity is formed. The ore (taconite) is then projected into the mixer and adheres to the binder while enlarging the grains, these latter however being isolated from each other by a superficial layer of alkaline lye which exudes at the surface by slow syneresis.

If necessary, after the formation of a first layer, a second layer may be formed on each grain by spraying with a fresh charge of inverse emulsion of asphalt cement and ore-dust.

The grains thus obtained can be put directly into use in the utilisation apparatus for igneous agglomeration, or they can be charged directly in their crude state into furnaces with a low charging level, low-hearth furnaces, rotary furances and in particular, electro-metallurgical furnaces.

3. *Agglomeration of blast-furnace dust*

Blast-furnace dust, which is moistened with a proportion of approximately 7% of water, is added to a quantity up to 5% by weight of asphalt cement and the resulting mixture is placed in or on a shaking-table. 11% of inverse emulsion is sprayed over the mixture in the form of very fine drops.

The grains of pitch of the asphalt cement are adsorbed by the small drops of oil and form small hydrocarbon nuts of high viscosity, to which the blast-furnace dust adheres as a coating.

The spraying of inverse emulsion is continued progressively until the quantity of emulsion reaches about 5% by weight of the treated dust.

The small balls formed around the nuts of the pitch a 'sorbed by the oil of the emulsion increase in volume, wh' other balls begin to form.

When the balls thus formed reach a diameter of 2 to 8 mm., they are evacuated for feeding into the apparatus for agglomeration by sintering. The remainder may be reintroduced into a new preparation cycle or treated by a further addition of emulsion.

4. *Agglomeration of very fine ores*

Very fine ore, the particles of which have a size comprised between 1 micron and 1/10 of a millimetre, is moistened with about 7% of water and then mixed with 1 to 5% of its weight in inverse emulsion. This emulsion is uniformly diffused at the surface of the particles. There is added to it 1 to 5% by weight of asphalt cement.

The mass thus formed is placed on a shaking-table or in a vibration device, and small drops of water are projected into it.

The quantity of water thus added in the form of fine drops can attain 10 to 15% by weight of ore, depending on the fineness and the nature of the ore. Small balls of agglomerated ore form on the fine drops of water, the water playing the part of the ossature in these small balls.

It is observed that the fine drops of water added to the mass dilute the inverse emulsion and render it more active.

The small balls thus obtained are sufficiently hard to withstand high temperatures without becoming deformed. They lend themselves to igneous agglomeration. They can also be directly used in metallurgy, their combustion being readily propagated from the surface to the heart.

This method of preparation can be applied to all very fine ores, especially to the pyrites ash referred to in Example 1.

5. *Agglomeration of the waste products of crushing*

In the usual preparation of ores by crushing, a substantial quantity of wates material is produced having a granular size ranging from a few microns up to 5 to 8 mm. This waste material thus contains both powdered material and granular material which may serve as an ossature for the purpose of agglomeration, as described in Example 1.

The waste products of crushing, either alone or mixed with secondary fuels, coal waste or sludges, and eventually with limestone flux, if so required, are humidified to 7 to 10%, then placed in a stirring apparatus and mixed with inverse emulsion. These gains are thus immediately wetted and uniformly coated.

3 to 5% of asphalt cement is added. The emulsion is broken down and, together with the pitch of the asphalt cement, results in a final binder of high viscosity. At the surface of the grains, this binder attracts the fine particles and forms small balls. The aqueous phase of the broken emulsion is taken up by the surface of the small balls, thus preventing them from adhering to each other. These small balls can be directly used on a Dwight-Lloyd chain for igneous agglomeration, or they are directly employed in their crude state for charging low-hearth furnaces, rotary furnaces, electro-metallurgical furnaces, etc.

6. *Agglomeration of chromites*

Apart from very rich rocks which may be directly used in an electric furnace with the addition of coke and quartz for the production of metal, there are natural rocks which are not so rich, yet which contain ore that can be treated in an electric furnace. This ore is separated from the rock by crushing and sorting; it is obtained in a powdered form.

With this ore, agglomerates are prepared which may be directly used in the electric furnace, by the application of the method of operation according to the invention.

Elements of coke are prepared, the dimensions of which vary between 2 and 5 centimetres. These elements are placed in a mixer and humidified if so required. An inverse emulsion is then poured over the said elements in the proportion of 3 to 5% of their weight, thus covering and wetting them instantaneously and uniformly. When the elements of coke are uniformly covered, 3 to 5% by weight of asphalt cement is then introduced so as to produce the final high viscosity binder which surrounds each element of coke.

The powdered chromite is then immediately projected into the mixer, progressively and in small quantities. This chromite penetrates into the fissures of the coke and is incorporated with the binder to form a coating. There is thus formed for each element of coke, a cohesive and strong nodule. The superficial exudation protects the surfaces of the nodules and prevents them from adhering to each other.

The nodules thus constituted, with an ossature of coke and a coating of chromite, are suitable to be treated directly in the electric furnace. They can also be stocked for use whenever they are required, since their consistency and surface insulation permit them to be piled up in heaps, even in inclement weather.

It will be evident that these nodules can be subjected to a baking process, if so required, before being charged into the metallurgical apparatus.

Instead of being carried out in a single stage, the agglomeration of chromites on an ossature of coke may be effected in two or more successive stages, during each of which only part of the inverse emulsion of asphalt cement and of chromite is projected on to the coke.

The operations are carried out in such manner that the agglomerated nodules obtained contain the proportion of chromite which corresponds to that of the fuel, coke and hydrocarbon binder required for the reduction of this ore, this proportion being of the order of 4 of chromite to 3 of coke.

What I claim is:

1. A method for preparing agglomerates for metallurgical uses comprising the steps of mixing granular elements with an emulsion of water dispersed in a continuous phase of hydrocarbon oil so as to coat said granular elements with said emulsion to thereby form a first product, then mixing said first product with a mixture of powdered pitch and hydraulic cement so as to coat said first product with said mixture of powdered pitch and hydraulic cement to thereby form a second product, then mixing said second product with powdered metal ore so as to coat said second product with said powdered metal ore and to form discrete nodules and sintering said nodules to produce self-supporting agglomerates.

2. A method for preparing agglomerates for metallurgical uses, comprising the steps of mixing combustible granular elements with an emulsion of water dispersed in a continuous phase of hydrocarbon oil so as to coat said combustible granular elements with said emulsion to thereby form a first product, then mixing said first product with a mixture of powdered pitch and hydraulic cement so as to coat said first product with said mixture of powdered pitch and hydraulic cement to thereby form a second product, then mixing said second product with powdered ore so as to coat said second product with said powdered ore and to form discrete nodules and sintering said nodules to produce self-supporting agglomerates.

3. A method for preparing agglomerates for metallurgical uses, comprising the steps of mixing grains of flux with an emulsion of water dispersed in a continuous phase of hydrocarbon oil so as to coat said grains of flux with said emulsion to thereby form a first product, then mixing said first product with a mixture of powdered pitch and hydraulic cement so as to coat said first product with said mixture of powdered pitch and hydraulic cement to thereby form a second product, then mixing said second product with powdered ore so as to coat said second product with said powdered ore and to form discrete nodules and sintering said nodules to produce self-supporting agglomerates.

4. A method for preparing aggloremates for metallurgical uses, comprising the steps of mixing granular elements with an emulsion of water dispersed in a continuous phase of hydrocarbon oil so as to coat said granular elements with said emulsion to thereby form a first product, mixing said first product with a mixture of powdered pitch and hydraulic cement so as to coat said first product with said mixture of powdered pitch and hyldraulic cement to thereby form a second product, then mixing said second product with powdered ore mixed with powdered fuel so as to coat said second product with said powdered ore mixed with said powdered fuel and to form discrete nodules and sintering said nodules to produce self-supporting agglomerates.

5. A method for preparing agglomerates for metallurgical uses, comprising the steps of mixing grandular elements with an amulsion of water dispersed in a continuous phase of hydrocarbon oil so as to coat said granular element with said emulsion to thereby form a first product, mixing said first product with a mixture of powdered pitch and hydraulic cement so as to coact said first product with said mixture of powdered pitch and hydraulic cement to thereby form a second product, mixing said second product with a mixture of powdered ore, powdered fuel and powdered flux so as to coat said second product with said mixture of powdered ore, powdered fuel and powdered flux and to form discrete nodules and sintering said nodules to produce self-supporting agglomerates.

6. A method for preparing agglomerates for metallurgical uses, comprising the steps forming granular elements by collecting finely divided particles of ore on drops of water, mixing said granular elements with an emulsion of water dispersed in a continuous phase of hydrocarbon oil so as to coat said granular elements with said emulsion to thereby form a first product, mixing said first product with a mixture of powdered pitch and hydraulic cement so as to coat said first product with said mixture of poweredred pitch and hydraulic cement to thereby form a second product, mixing said second product with additional powdered ore so as to coat said second product with said additional powdered ore and to form discrete nodules and sintering said nodules to produce self-supporting agglomerates.

References Cited in the file of this patent

UNITED STATES PATENTS

| 2,411,873 | Firth | Dec. 3, 1946 |
| 2,544.752 | Gelbman | Mar. 13, 1951 |
| 2,805,141 | Apuli | Sept. 3, 1957 |
| 2,808,325 | Subervie | Oct. 1, 1957 |
| 2,858,204 | Meyer et al | Oct. 28, 1958 |